(No Model.)

W. SOONS.
OUTLET BOX FOR ELECTRIC WIRING.

No. 591,300. Patented Oct. 5, 1897.

WITNESSES:
F. W. Wright.
S. C. Connor

INVENTOR
William Soons
BY
Howson & Howson
ATTORNEY

THE NORRIS PETERS CO., PHOTO-LITHO., WASHINGTON, D. C.

UNITED STATES PATENT OFFICE.

WILLIAM SOONS, OF NEW YORK, N. Y., ASSIGNOR TO HUBERT KRANTZ, OF BROOKLYN, NEW YORK.

OUTLET-BOX FOR ELECTRIC WIRING.

SPECIFICATION forming part of Letters Patent No. 591,300, dated October 5, 1897.

Application filed December 24, 1896. Serial No. 616,952. (No model.)

*To all whom it may concern:*

Be it known that I, WILLIAM SOONS, a subject of the Queen of Great Britain and Ireland, and a resident of New York city, New York, have invented an Improved Outlet-Box for Electric Wiring, of which the following is a specification.

My invention relates to the construction, for electric wiring, of outlet-boxes to support and conceal work—such as ceiling-blocks, rosettes, brackets, wall-sockets, receptacles, and other fixtures for lighting, telephone, and other electric wires—in ceilings, walls, floors, or other constructions.

The object of my invention is to so construct an outlet-box of the character described that it will be convenient in use and facilitate the connecting up of the wires, be simple and inexpensive in construction, and make a good appearance.

Figure 3:
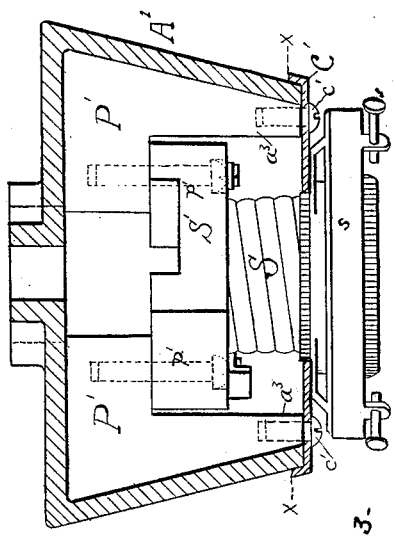
Figure 1:
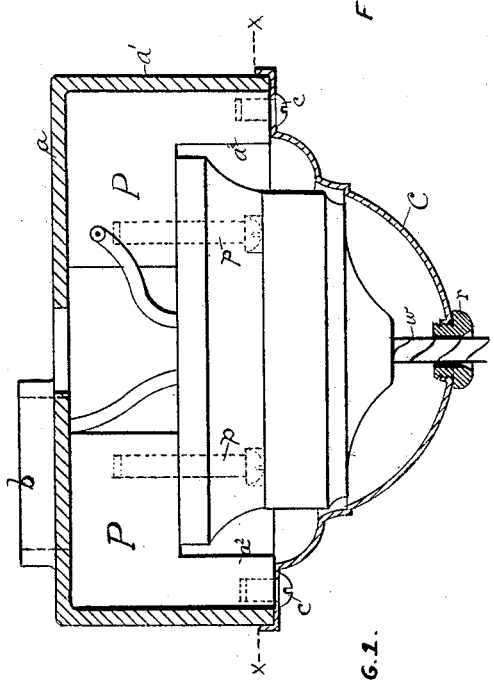
Figure 2:
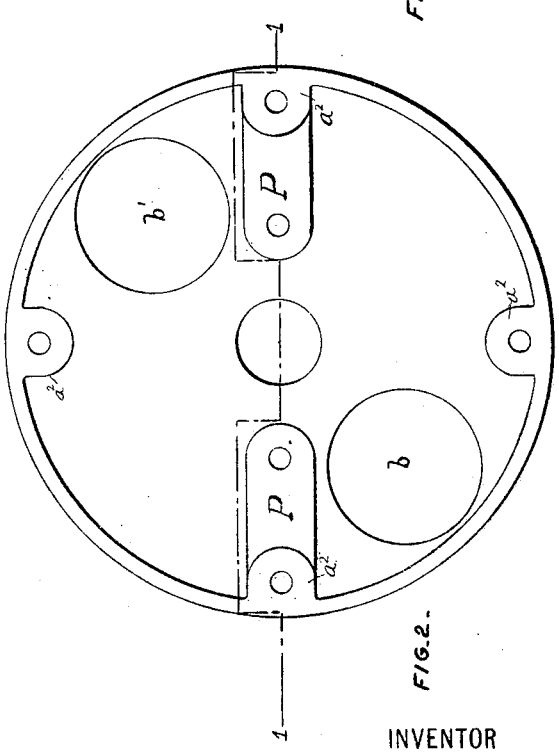

In the accompanying drawings, Figure 1 is a section on the line 1 1, Fig. 2, of one form of my invention. Fig. 2 is a face view of the box with the cover and insulating attachment removed. Fig. 3 is a section on the line 3 3, Fig. 4, of a modification; and Fig. 4 is a face view of the outlet-box shown in Fig. 3, but with the cover, socket, and insulating-base removed.

Figure 4:
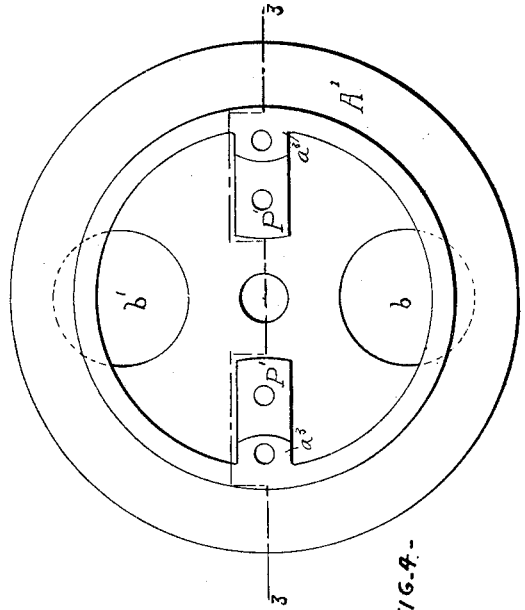

In Figs. 1 and 2 I have shown my invention as constructed for supporting and concealing a rosette, while in Figs. 3 and 4 I have shown my invention as constructed for supporting and concealing a wall-socket or receptacle for an incandescent electric lamp.

In Figs. 1 and 2 the outlet-box A is shown as having a flat bottom $a$ and cylindrical wall $a'$, the box being open at the front, which in the use illustrated in Fig. 1 is on the under side. The dotted line X X indicates the face-line of the ceiling in which the box is to be concealed. The wiring-tubes may enter the box by the back or sides, as desired. In Figs. 1 and 2 the box has been shown as provided with two flanged openings or sockets $b\ b'$, onto which the ends of the wiring-tubes are to be fitted.

The open face of the box is to be closed by a sheet-metal canopy or cover C, which is preferably flanged, as shown, to fit around the upper edge of the box, as illustrated in Fig. 1, and is adapted to be secured in place by the screws $c$ entering threaded openings formed in projections $a^2$ of the box A. In Fig. 2 I have illustrated four of these projections, but two will ordinarily suffice.

To support the rosette, ceiling-block, socket, or other such fixture at a distance from the bottom of the box to permit of the convenient bringing in and securing of the wires, I cast or otherwise form or affix to the box, lugs, posts, or pillars P, to which the rosette or other insulating-piece may be secured by screws, such as indicated at $p'$, or other suitable means. In the present instance I have shown these pillars or lugs P as cast in one with the rest of the box, which may be conveniently made of cast-iron and lined or not with porcelain or other suitable indestructible insulating material.

Where the cover or canopy for the open side of the box is to conceal a rosette, ceiling-block, or other such article, it may be made of the ornamental rounded form illustrated in Fig. 1, and provided with a central screw-ring $r$ of insulating material, through which to pass the sustaining and conducting wires $w$.

Where the outlet-box is for supporting and concealing a wall-socket, receptacle, or other such article, I prefer to construct the box of the tapering form illustrated in Fig. 3, so that the part of the box A' which projects through the ceiling, wall, or other such construction may be of the smallest size possible, while the back of the box will be of sufficient diameter to provide two or more openings $b\ b'$ for the reception of the ends of the wiring-tubes.

In Fig. 3 I have shown a wall-socket S, mounted on an insulating-base S', secured by screws $p'$ to pillars P', similar to the pillars P described in connection with Figs. 1 and 2. In connection with this socket S is shown a shade-holder $s$, and back of the shade-holder is applied the sheet-metal cover C', secured in place by suitable screws $c'$ entering threaded openings in projections $a^3$ on the inner face of the outlet-box A'.

I claim as my invention—

1. An outlet-box for electric wiring having within the box, pillars or lugs for the support of a rosette or other insulation-fixture some distance from the bottom of the box, substantially as described.

2. An outlet-box for concealed electric wiring having its walls tapering, wider at the back where the wiring-tubes enter than at the front, substantially as and for the purposes set forth.

In testimony whereof I have signed my name to this specification in the presence of two subscribing witnesses.

WILLIAM SOONS.

Witnesses:
 EDITH J. GRISWOLD,
 HUBERT HOWSON.